(12) United States Patent
Pan

(10) Patent No.: US 8,556,231 B2
(45) Date of Patent: Oct. 15, 2013

(54) VERTICAL ROTOR TYPE GAS SOLENOID VALVE

(76) Inventor: Zhaokeng Pan, Foshan (CN)

( * ) Notice: Subject to any disclaimer, the term of this patent is extended or adjusted under 35 U.S.C. 154(b) by 229 days.

(21) Appl. No.: 13/142,565

(22) PCT Filed: Feb. 4, 2010

(86) PCT No.: PCT/CN2010/000154
§ 371 (c)(1),
(2), (4) Date: Jun. 28, 2011

(87) PCT Pub. No.: WO2010/097010
PCT Pub. Date: Sep. 2, 2010

(65) Prior Publication Data
US 2011/0297857 A1    Dec. 8, 2011

(30) Foreign Application Priority Data

Feb. 26, 2009  (CN) .......................... 2009 1 0037537

(51) Int. Cl.
- F16K 31/02 (2006.01)
- F16K 31/06 (2006.01)
- H01F 7/14 (2006.01)
- H01F 3/04 (2006.01)

(52) U.S. Cl.
USPC .............. 251/129.11; 251/129.2; 251/129.15; 251/129.18; 335/279; 335/281

(58) Field of Classification Search
USPC ........... 251/129.11, 129.2; 335/279, 281, 282
See application file for complete search history.

(56) References Cited

U.S. PATENT DOCUMENTS

| | | | | |
|---|---|---|---|---|
| 2,629,031 A | * | 2/1953 | Ballman | 335/276 |
| 2,671,863 A | * | 3/1954 | Matthews | 310/36 |
| 3,221,191 A | * | 11/1965 | Cuches | 310/36 |
| 3,593,233 A | * | 7/1971 | Ellenberger | 335/125 |
| 4,321,571 A | * | 3/1982 | Meyer | 335/272 |
| 6,641,108 B1 | * | 11/2003 | Pan | 251/129.09 |

FOREIGN PATENT DOCUMENTS

| | | |
|---|---|---|
| CN | 2343444 Y | 10/1999 |
| CN | 2504449 Y | 8/2002 |
| CN | 1601184 A | 3/2005 |
| CN | 201053506 Y | 4/2008 |
| CN | 101493157 A | 7/2009 |
| JP | 2190691 A | 7/1990 |
| JP | 11210561 A | 8/1999 |
| JP | 2001003769 A | 1/2001 |

OTHER PUBLICATIONS

International Search Report for international application No. PCT/CN2010/000154 issued by the International Searching Authority mailed on May 13, 2010.

* cited by examiner

*Primary Examiner* — John Bastianelli
*Assistant Examiner* — Seth W Mackay-Smith
(74) *Attorney, Agent, or Firm* — Amster, Rothstein & Ebenstein LLP

(57) ABSTRACT

A vertical rotor type gas solenoid valve comprises a valve case (14), a regulating spring (11), a regulating nail (10), a rotor regulating screw (9), a regulating screw bracket (12), a swing arm (18), a sealing gasket component arranged at an outer end of the swing arm (18), and a vertical rotor type electromagnet. The valve case (14) comprises a gas net (15), a gas outlet (16) and a valve port (17). The gas flow and the curve of the gas flow against the electric current of the winding can be regulated, and the minimum starting point of gas flow is determined.

9 Claims, 4 Drawing Sheets

VERTICAL ROTOR TYPE GAS SOLENOID VALVE

TECHNICAL FIELD

The present invention relates to the technical field of gas solenoid valve, and more particularly to a vertical rotor-type gas solenoid valve.

BACKGROUND

A rotor-type gas solenoid valve uses a rotor-type electromagnet as a drive element, in which a rotor core is fixed by means of a rotation shaft of the rotor-type electromagnet. A clearance between the rotor core and a stator core may be very small, while the rotation shaft and a bearing can produce a friction force. Since the diameter of the rotation shaft is much less than that of the rotor, this friction force is much less than the friction force directly generated by a direct contact between a spool and a solenoid wall in a solenoid-type electromagnet. The rotor-type electromagnet has a great initial attraction force, which just meets the requirement for overcoming the back pressure and the adhesive force between a valve port and a rubber sealing when the gas solenoid valve is opened. Moreover, a characteristic graph of the electric current versus the travel of the rotor-type electromagnet has a good linearity. Specifically, when the clearance between the rotor and the stator decreases, the initial attraction force will be relatively large, and the rotation torque will be considerably reduced as a rotation angle of the rotor increases; on the other hand, if the clearance between the rotor and the stator increases, the initial attraction force will be relatively small, and the rotation torque will be slightly reduced as a rotation angle of the rotor increases. Accordingly, the current-torque performance of the rotor-type electromagnet is in connection with the clearance between the rotor and the stator.

Like other kinds of electromagnets, the rotor-type electromagnet has the following properties: in the case that the ampere-turns of coil and the material of magnetic conductor are identical, the electromagnetic driving force is in inverse proportion to a length of magnetic circuit, but is in direct proportion to a cross-section area of the magnetic circuit; that is to say, the same effect can be achieved by reducing the cross-section area of the magnetic circuit correspondingly at the time of shortening the magnetic circuit. Meanwhile, the geometrical cross-section shape of a coil winding also directly influences the usage amount of lacquered wire and the resistance value of the coil winding in the case of the same turns of coil. For example, in the case of the same cross-section areas, a coil winding with a circular cross-section shape will lead to a much less usage amount of copper than a coil winding with a rectangular cross-section shape.

There are various rotor-type gas solenoid valves used in gas utensils. The current rotor-type gas solenoid valves have respective advantages and disadvantages, so that their structures are still have the necessity of being improved in order to meet the requirements of having a sound structure and an excellent performance, simplifying the manufacturing processes, saving material and reducing the cost.

Chinese Utility Model Patent published as No. CN2343444 discloses "a rotor-type closable gas regulating valve", in which a rotor-type electromagnet without a stop iron is used as a drive element to directly drive a valve sheet clutch (valve plate clutch), which synchronously rotates with the rotation shaft and clings to the outlet valve port, so as to achieve the object of gas sealing and regulating. The rotor-type electromagnet adopts a horizontal structure, in which the planes of the rotor core and stator core are parallel. In the rotation range of the rotor, it is necessary to maintain a certain space. Thus, the magnetic circuit of the rotor-type electromagnet will be lengthened, because a rotor rotation space is reserved for the rotor at the coil winding side thereof. If the stator core of the rotor-type electromagnet is manufactured as one piece, the cost of manufacturing will be quite high. Accordingly, such a stator core is formed of thin-sheet magnetic conductive material (magnetic permeability material, such as silicon steel sheet) by punching-shearing and laminating processes. However, the core formed by laminating punched sheets has a rectangular cross-section shape in the portion of the stator coil winding. Correspondingly, in order to prevent the corners in the shape of rectangle from damaging insulating layers of the lacquered wire, the coil is necessarily provided with an insulating framework, so that the usage amount of copper for the coil with a rectangular cross-section is much more than that for the coil with a circular cross-section. In the rotor-type electromagnet of this patent, the concentricity between the rotor cambered surface and the stator cambered surface can be ensured by positioning of a bracket riveted on the stator, and the rotor and stator are easy to impact with each other due to insufficient concentricity when the clearance therebetween is small. A starting point of this regulating valve is located in a joint where the rotor cambered surface meets the stator cambered surface, and the rotor presses the valve sheet closely against the valve port by means of a regulating spring. In the case that the electric current of the coil winding is constant, the regulating spring can regulate the initial action force of a valve body via a regulating screw, but cannot regulate a skew degree of a characteristic graph of the rotor versus the drive current, and thus can not change a graph of the regulated gas flow of the valve body versus the current of coil winding on occasion; whereas this characteristic graph is often influenced by the materials of the rotor and the stator as well as the clearance and concentricity between the rotor and the stator. If the skew degree of the characteristic graph cannot be changed, the gas regulating valve will be unable to adapt to different regulating properties required by various gas utensils, and thus versatility and interchangeability of products can not be guaranteed. Although the regulating valve disclosed in this patent is used to regulate by a solution with a small clearance and a small swing angle of the rotor, the valve is a clap-fit structure, so that even a quite small displacement distance of the valve sheet would cause a considerable variation of gas flow, the advantage of long attraction travel of the rotor-type electromagnet can not be fully utilized. As a result, the regulation of the gas flow will be difficult to be performed and have a low regulation accuracy.

The Utility Model Patent published as No. CN2504449 with a title of "Rotor-Type Electromagnetic Regulating Valve" discloses a rotor-type electromagnet regulating valve consisted of a rotor-type electromagnet drive mechanism and a butterfly valve regulating mechanism, which are coaxially and directly connected with each other. As the electromagnet regulating valve employs a butterfly valve, the maximum rotation angle thereof is up to 80°, and thereby a relatively large clearance should be provided between the rotor and the stator of the rotor-type electromagnet thereof to meet such requirement, so that the propulsion power would be increased correspondingly. The rotor-type electromagnet of the embodiment illustrated in FIG. 13 of the drawings of this patent adopts a horizontal structure, so that there still exists some disadvantages, such as the magnetic circuit length being long, the usage amount of copper being large due to the coil winding with a rectangle shape, the concentricity between the rotor and the stator being difficult to be ensured, and so on. Since no screw can be available for regulation, and the gas flow has no initial position-limiting, the universality and interchangeability of regulating valve products are unable to be ensured due to the following factors, such as the magnetic conductive material of the rotor-type electromagnet, errors of the clearance and concentricity between the rotor and stator, variation of spring parameters, and so on. Therefore, this regulating valve is incapable of adapting to different requirements of various gas utensils. If a butterfly regulating mechanism is used to regulate the gas flow, the minimum gas flow can be merely ensured by machining precision of the butterfly sheet and through hole in the case that the starting point of the minimum gas flow is not adjustable. However, when the gas utensil uses liquefied petroleum gas and heat load is relatively small, even with machining precision error of 0.01 mm between the butterfly sheet and through hole, a considerable gas flow error would be caused. Therefore, machining precision should be improved in order to satisfy operating requirements. As the maximum rotation angle of the butterfly sheet is up to 80°, at this point, the driving force would be merely dozens of grams even though the power supplied to the rotor-type electromagnet is increased. Moreover, when the gas flow passing through the valve body is at its maximum level, the flow rate thereof may be beyond 10 m/s, the butterfly sheet will tremble under heavy impact of the gas flow and thus the regulation of the gas flow will be influenced correspondingly.

The Utility Model Patent published as No. CN2504449 also discloses a schematic view of a structure of a vertical rotor-type electromagnet in FIG. 15 of the drawings of specification thereof. As can be seen from FIG. 15, a reset spring of the electromagnet is located between a rotor and a coil winding, and a stator structure thereof is manufactured by means of a laminating method. Upon laminating, a laminated surface of the lamination needs to be transversely formed a cambered surface which is opposite to the rotor, so that it is very difficult in processing, and if the stator is manufactured as one piece, the processing cost will be quite high. Moreover, the fixation fitting between the rotor and the stator is not indicated in the figure. Obviously, in the illustrated vertical rotor-type electromagnet, the influence of the magnetic circuit on the effect of the electromagnetic action is neither taken into consideration, and nor do such factors as the regulation of the graph of the magnetic force and rotor travel versus the electric current, the way of precise positioning of concentricity between the rotor and the stator, the difficulty of processing and the high cost in a mass production of the stator structure, and so on.

SUMMARY OF THE INVENTION

An object of the present invention is to provide a vertical rotor-type gas solenoid valve, which can enable the magnetic circuit of the solenoid valve to be shortened and the machining process to be simplified while precise positioning and convenient adjustment of concentricity between the rotor and the stator can be ensured, can regulate the graph of the gas flow (amount) versus the electric current on occasion, and can determine a minimum starting point of gas flow and achieve a precise regulation and positioning thereof. Moreover, the solenoid valve can be developed into a strong suction valve.

The present invention can accomplish the above-mentioned object by providing the following technical solution: a vertical rotor-type gas solenoid valve comprises a valve case provided with a gas inlet, a gas outlet and a valve port, a regulating spring; a regulating nail; a rotor regulating screw; a regulating screw bracket; a swing arm; a vertical rotor-type electromagnet and a rubber sealing gasket assembly arranged at an outer end of the swing arm; the vertical rotor-type electromagnet including a coil winding, a stator core, two stator side sheets, a rotor, an upper rotor-retainer sheet and a lower rotor-retainer sheet, the rotor being in a shape of elongated strip provided with external arcuate surfaces symmetrically at its front and back ends; wherein a rotor shaft of the vertical rotor-type electromagnet is located at a centerline of the stator core, the upper and lower rotor-retainer sheets each is at an angle of 90° with respect to the rotor shaft, the upper rotor-retainer sheet is located on an upper side of the rotor and proximate to an external surface of the coil winding, the lower rotor-retainer sheet is located on a lower side of the rotor and at outer ends of the stator side sheets, outer end arcuate surfaces of the upper and lower rotor-retainer sheets are fastened and connected to the associated internal arcuate surfaces of the stator side sheets respectively, the outer ends of the stator side sheets are fastened on the valve case, the rotor shaft penetrates through the valve case with the swing arm being fixedly mounted at an outer end of the rotor shaft, a rubber sealing gasket of the rubber sealing gasket assembly connected at the outer end of the swing arm is engaged against the valve port, a sealing ring is arranged between the rotor shaft and the valve case, a circular hole is provided at the center of the lower rotor-retainer sheet, a bearing boss is secured in the circular hole and the associated portion of valve case, the rotor shaft is movably connected with a center hole of the bearing boss, the regulating screw bracket that can be displaced in a transverse direction and the rotor regulating screw are arranged outside of the valve case with the regulating spring mounted between the regulating nail and the rotor regulating screw, and an outer end of the regulating nail is contacted with and connected to an adjacent side surface of the rotor.

In a preferred embodiment of the invention, the stator core of the vertical rotor-type electromagnet may have a cross-section of in a circular geometrical shape, the stator core may be wrapped with an insulating layer having a thickness of 0.05 mm-0.1 mm, around which a lacquered wire coil may be directly wound.

In a preferred embodiment of the invention, the upper and lower rotor-retainer sheets may be non-magnetic conductors in a shape of elongated strip having a thickness of 0.5 mm-1.5 mm and having their outer end surfaces in the form of arcuate surfaces, the outer end arcuate surfaces of the upper and lower rotor-retainer sheets may be fixed and connected to the corresponding internal arcuate surfaces of the stator side sheets via bonding adhesive or welding, a distance between the upper rotor-retainer sheet and the external surface of the coil winding may be 0.5 mm-1.5 mm.

In a preferred embodiment of the invention, a clearance between the external arcuate surface of the rotor and the internal arcuate surface of the stator side sheets may be 0.1 mm-0.5 mm, and the distances from the upper and lower rotor-retainer sheets to the corresponding upper and lower surfaces of the rotor may be 0.5 mm-1 mm.

In a preferred embodiment of the invention, a boss may be provided in the internal arcuate surface of one of the two stator side sheets of the stator core, in the case that the vertical rotor-type electromagnet is the type of having an iron stopper.

In a preferred embodiment of the invention, an outer end of the swing arm may have a circular shape and may be provided with a circular boss, the circular boss may protrude into a circular hole of the rubber sealing gasket, in which the circular hole has a shape matching with a shape of the outer end of the swing arm with a clearance retained between the outer end of the swing arm and this circular hole, a gasket spring may be arranged between the swing arm and a seal gasket located on the rubber sealing gasket, and a centerline of the rotor shaft may be coincidence with a plane of the valve port.

In a preferred embodiment of the invention, the outer end of the swing arm may be provided with a center hole in which a blind hole with a diameter of 3 mm-4 mm is provided and a permanent magnet is installed in the blind hole, a magnetic conductor regulating block located at the center of a sealing face of the rubber sealing gasket may be matched and connected with the permanent magnet.

In a preferred embodiment of the invention, the magnetic conductor regulating block may be in the form of a round sphere or an inverted cone, and a profile line of longitude section of an upper internal wall of the valve port may be in the form of a gradually-varied curve in such a way that it is wide at the top and narrow at the bottom.

In a preferred embodiment of the invention, the rotor regulating screw is located on a side of the internal arcuate surface of one of the stator side sheets, the centerline of the regulating spring forms an angle of 90°±30° with respect to a projection lire of an end surface of the rotor, and the angle can be regulated by displacing the regulating screw bracket transversely.

The rotor shaft of the vertical rotor-type electromagnet is located at the centerline of the stator core, the upper rotor-retainer sheet is proximate to the external surface of the coil winding, and the stator core is a circular core, so that the circular stator core merely need to be wrapped with an insulating material having a thickness of 0.05 mm when the lacquered wire is used to wind around the stator core. Thus, as compared with the quadrate stator core in which coil winding should be wound by means of an insulating framework, the effective winding perimeter in the invention will be considerably reduced. In comparison with the prior art, the magnetic circuit length of this vertical rotor-type electromagnet can be shortened by more than 20%; and because of shortening the magnetic circuit, the cross-section area of the stator core of the invention can be reduced correspondingly under the condition that the driving force is identical. Under the condition that the cross-section area of the stator core is reduced and the lacquered wire is directly wound around the circular stator core, the usage amount of the lacquered wire for winding the coil winding can be reduced by 30% or more.

The stator core of the vertical rotor-type electromagnet can use cylindrical electrical pure iron, the stator side sheets thereof can also be formed by punching electrical pure iron and then positioning and riveting the punched items. After the stator core of the vertical rotor-type electromagnet are wound by coil, the outer end arcuate surfaces of the upper and lower rotor-retainer sheet can be fixed with the corresponding internal arcuate surfaces of the stator side sheets by means of a bonding adhesive or a laser welding. The rotor shaft penetrates through the shaft holes at the center of the upper and lower rotor-retainer sheet, the shaft holes of the upper and lower rotor-retainer sheets and the outer end arcuate surfaces of the same are punched and formed at the same time, so that the concentricity error therebetween can be limited in a range of 0.01 mm-0.03 mm. The bearing boss of the lower rotor-retainer sheet is installed in the circular hole of the valve case to perform a function of concentric positioning. This mounting process is not only simple, but also can ensure the concentricity error between the rotor and stator within 0.03 mm.

When the rotor presses the rubber sealing gasket onto the valve port by means of the regulating spring, the arcuate surfaces on both ends of the rotor just meet the internal arcuate surfaces of the stator side sheets; at this time, the pressure for pressing the rubber sealing gasket against the valve port can be changed by regulating the rotor regulating screw. When the coil winding receives an initial current, the minimum opening between the rubber sealing gasket and the valve port can be changed by regulating the rotor regulating screw. By means of transverse displacement of the regulating screw bracket, the skew degree of the graph of the opening between the rubber sealing gasket and the valve port can be varied.

When the permanent magnet and the magnetic conductor regulating block are not mounted, the invention may be served as an on-off valve for controlling the switching on/off of the gas. At this point, if the valve is used for regulating the gas flow, the gas flow varies considerably upon the opening between the rubber sealing gasket and the valve port varies slightly, so that the advantage of large rotation angle of the rotor-type electromagnet can not be utilized, and the performance for regulating the gas flow is also undesirable. Once the permanent magnet is installed in the blind hole at the outer end of the swing arm, the permanent magnet intends to attract to the magnetic conductor regulating block across the rubber sealing gasket, then the clearance between the magnetic conductor regulating block and the variable-diameter curved surface inside the valve port will gradually increase with the increasing of the opening between the rubber sealing gasket and the valve ports. Thus, the gas flow can be smoothly and precisely regulated by changing the electric current of the coil winding. To regulate the gas volume by using the permanent magnet for attracting the magnetic conductor regulating block can also enable the magnetic conductor regulating block to be positioned automatically with the center of valve port. Moreover, after opening and closing the rubber sealing gasket every time, the magnetic conductor regulating block pushes foreign matters within the valve port out from the valve port, and a function of self-cleaning can be accomplished. As the magnetic conductor regulating block can be automatically positioned within the valve port, the manufacturing processes of the gas regulating valve become simple; due to the self-cleaning function for the valve port, the gas solenoid valve can be applied to the application in which the gas contains much foreign matters. The vertical rotor-type gas solenoid valve of the invention can be used both for regulating the gas flow and for controlling the switching on/off thereof.

When the internal arcuate surface of one of the stator side sheets is provided with a boss, and the permanent magnet and the magnetic conductor regulating block are not employed, the solenoid valve becomes a rotor-type strong suction valve. The strong suction valve allows, after the rotor thereof and the boss of the internal arcuate surface of the stator side sheet are attracted to each other, the attraction engagement position of the rotor is still to be maintained even the electric current in the coil winding is reduced. The boss is inserted merely on the internal arcuate surface of the stator side sheet on single side in order to prevent the rotor from being not restored to its original position after the winding electric current is removed due to the remanence of the rotor or stator.

The present invention has the following prominent technical effects as compared with the prior art.

(1) In the gas solenoid valve of the invention, the usage amount of lacquered wire and magnetic conductive material required by the vertical rotor-type electromagnet serving as an electromagnetic drive will be considerably reduced. Because of the saving in material, the convenience in regulation, the simplicity in manufacturing processes, the gas solenoid valve according to the invention is suitable for a mass production, and comprehensive cost thereof may be reduced by 40% or more.

(2) The invention takes the advantage of the long action travel (length) of the rotor-type electromagnet, with which the gas flow can be regulating precisely, and the minimum starting point of gas flow as well as the regulation skew degree can be adjusted conveniently.

(3) A single valve body can be used both for regulating and switching on/off the gas flow.

The invention is mainly applied to regulate of the gas flow in the gas utensil and control the switching on/off thereof.

DETAILED DESCRIPTION OF THE EMBODIMENTS

Hereinafter, the present invention will be described in detail with reference to preferred embodiments in conjunction with the accompanying drawings.

The First Embodiment

Figure 1:
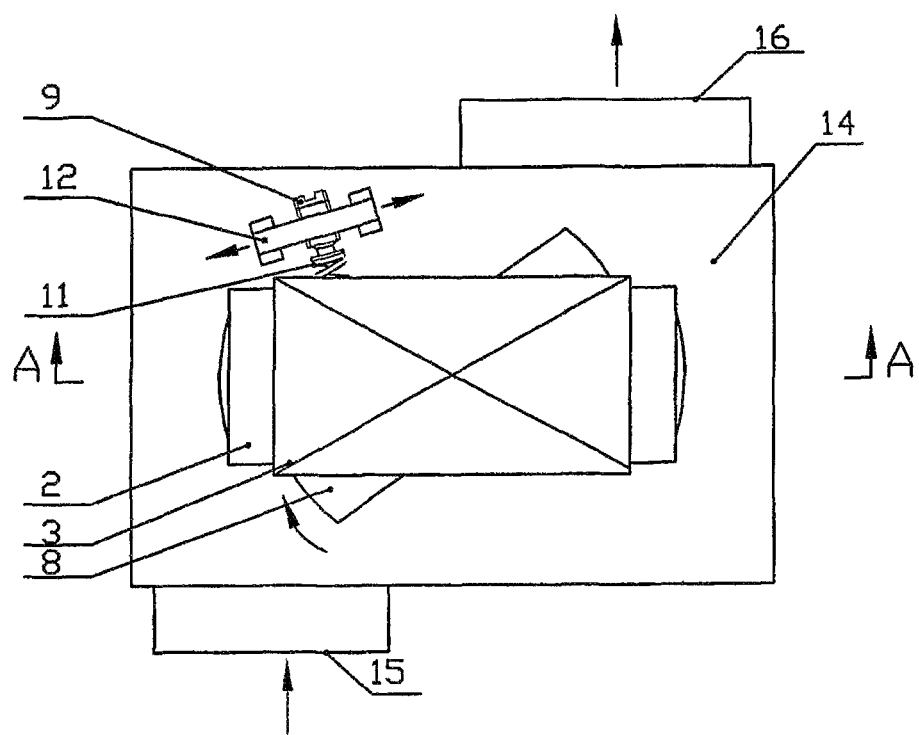
FIG. 1 is a schematic view showing the appearance of the vertical rotor-type gas solenoid valve of the first embodiment of the invention.
Figure 2:
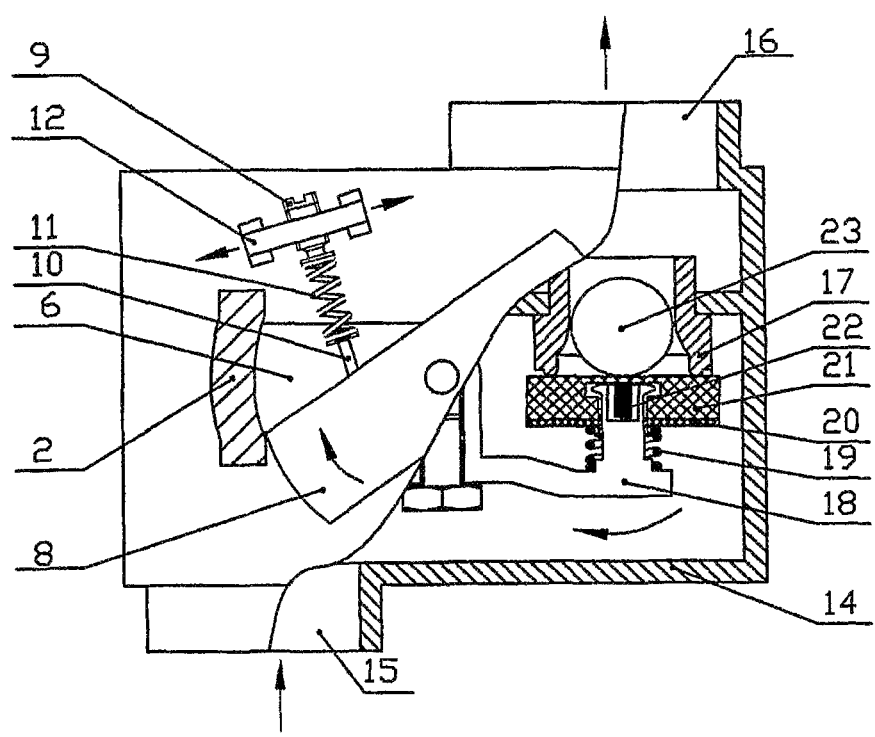
FIG. 2 is a partial section view of FIG. 1.
Figure 3:
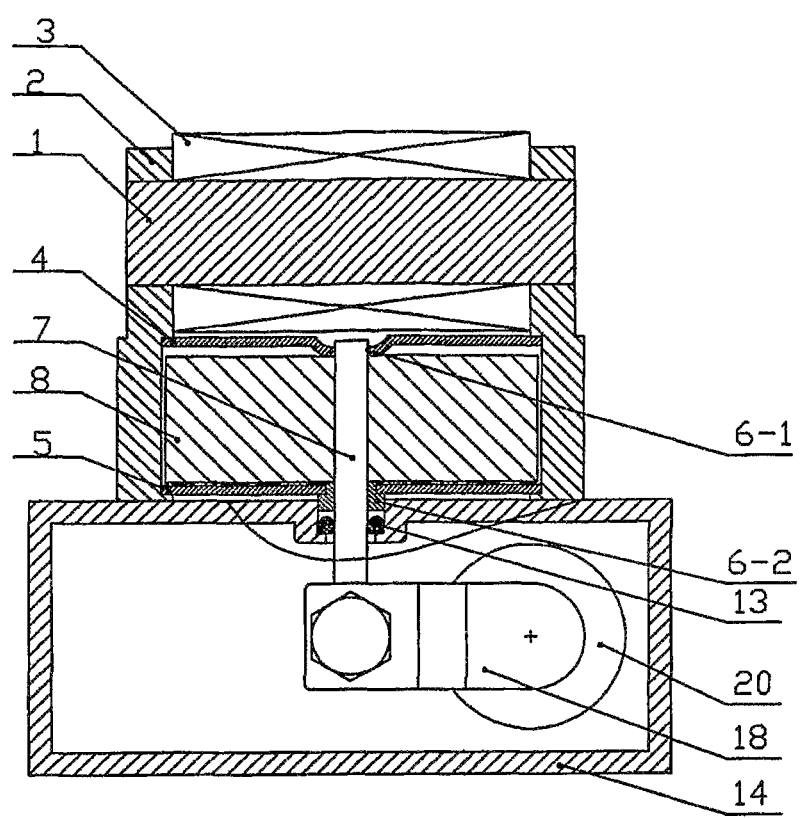
FIG. 3 is a section view taken along line A-A of FIG. 1.

Referring now to FIGS. 1, 2 and 3, a vertical rotor-type gas solenoid valve consists of a vertical rotor-type electromagnet, a valve case 14, a regulating spring 11, a regulating nail 10, a rotor regulating screw 9, a regulating screw bracket 12, a swing arm 18 and a rubber sealing gasket assembly arranged at an outer end of the swing arm 18. The valve case 14 is provided with a gas inlet 15, a gas outlet 16 and a valve port 17. The vertical rotor-type electromagnet consists of a coil winding 3, a stator core 1, stator side sheets (side plates) 2, a rotor 8, an upper rotor-retainer sheet 4 and a lower rotor-retainer sheet 5. The rotor 8 is strip-shaped and is provided with external arcuate surfaces that are front-and-back symmetrical with each other.

A rotor shaft 7 of the vertical rotor-type electromagnet is located at a centerline of the stator core 1, the upper and lower rotor-retainer sheets 4, 5 each is at an angle of 90° with respect to the rotor shaft 7. The upper rotor-retainer sheet 4 is located on an upper side of the rotor 8 and proximate to the external surface of the coil winding 3, the lower rotor-retainer sheet 5 is located on a lower side of the rotor 8 and at outer ends of the stator side sheets 2, outer end arcuate surfaces of the upper and lower rotor-retainer sheets 4, 5 are fastened and connected to the associated internal arcuate surfaces of the stator side sheets 2 respectively, and the outer ends of the stator side sheets 2 are fastened on the valve case 14. The rotor shaft 7 penetrates through the valve case 14 with the swing arm 18 be fixedly mounted at an outer end thereof, and the rubber sealing gasket 21 is connected at an outer end of the swing arm 18 and is attached against the valve port 17. An O-type rubber sealing ring 13 is arranged between the rotor shaft 7 and the valve case 14. A circular hole is provided at the center of the lower rotor-retainer sheet 5, a bearing boss 6-2 is secured in the circular hole and the associated portion of valve case 14, and the rotor shaft 7 is movably connected with a center hole of the bearing boss 6-2. the regulating screw bracket 12 which may be displaced in a transverse direction and the rotor regulating screw 9 are arranged outside of the valve case 14, the regulating spring 11 is mounted between the rotor regulating screw 9 and the regulating nail 10, and an outer end of the regulating nail 10 is contacted with and connected to a side surface of the rotor 8.

The vertical rotor-type gas solenoid valve of this embodiment may be used both for regulating and switching on/off the gas flow. The regulating spring 11 is mounted between the regulating nail 10 located on one side of the rotor 8 and the rotor regulating screw 9. With regulating the rotor regulating screw 9, the rotor 8 is pressed to the joint where the lower end of the external arcuate surface of the rotor and the upper end of the corresponding internal arcuate surface of the stator side sheets 2 meet with each other, and at this time, the rubber sealing gasket 21 has been pressed against the valve port 17. By regulating the regulating screw bracket 12 transversely, the angle formed by the centerline of the regulating spring 11 and the rotor regulating screw 9 with respect to a side edge of the rotor 8 can be changed, so that the graph of the electric current of the coil winding 3 versus the travel of the rotor 8 can be varied by the change of the travel of the rotor 8 and the variation in pressure of the regulating spring 11. In the case that the minimum electric current is supplied to the coil winding 3, the minimum opening between the rubber sealing gasket 21 and the valve port 17 may be changed by regulating the rotor regulating screw 9. In this embodiment, the vertical distance between the centerline of the regulating nail 10 and that of the rotor shaft 7 is 9 mm; and with the transverse displacement of the regulating screw bracket 12, the angle of the centerline of the regulating spring 11 with respect to a projection line of the adjacent rotor side edge varies in a range of ±15°.

The stator of this vertical rotor-type electromagnet are formed by riveting a circular stator core 1 and two stator side sheets 2 that are symmetrically mounted and are punched with arcuate surface inside thereof, so that the manufacturing process of the stator is simple. Moreover, the coil winding 3 is directly wound around the stator core 1 which is merely wrapped by an insulating material with a thickness of 0.05 mm, without an insulating framework disposed between the stator 1 and the coil winding 3. At the same time, since the rotor 8 is proximate to the coil winding 3, the magnetic circuit can be shortened, and the cross-section area of the stator core can be reduced correspondingly. In summary, with the rotor-type electromagnet of this embodiment, the usage amount of copper can be reduced by 35%, and the usage amount of magnetic conductive material can be reduced by 20%, as compared with other kinds of rotor-type electromagnet having identical rotation torque and travel.

In FIG. 3, the distance between the upper rotor-retainer sheet 4 and the adjacent external surface of the coil winding 3 is 0.5 mm, the lower rotor-retainer sheet 5 is located at the lower ends of the internal arcuate surfaces of the stator side sheets 2. The outer end arcuate surfaces of the upper and lower rotor-retainer sheets 4, 5 and the internal arcuate surface of the stator side sheets 2 both have the same curvature and form a transition fit therebetween, and they are bonded and fixed with an adhesive agent. The rotor 8 is located between the upper and lower rotor-retainer sheets 4, 5, and remains a clearance of 0.5 mm with respect to the upper and lower rotor-retainer sheets 4, 5, respectively. The rotor shaft 7 penetrated through the upper and lower rotor-retainer sheets 4, 5 is movably fitted with a shaft hole 6-1 and a center hole of the bearing boss 6-2 respectively, and the clearances between the external arcuate surfaces of both ends of the rotor 8 and the internal arcuate surfaces of the stator side sheets 2 are 0.15 mm. The rotor shaft 7 is tightly fitted with the rotor 8. In this embodiment, the rotor 8 is composed of six electrical pure iron sheets with 2 mm thickness that are concentrically punching-sheared and laminated together, convex arcuate surfaces of the upper rotor-retainer sheet 4 and the lower rotor-retainer sheet 5 and the shaft hole 6-1 as well as the excircle matching with the bearing boss 6-2 are formed by punching at the same time; the bearing boss 6-2 mounted at the center of the lower rotor-retainer sheet 5 protrudes into the circular hole of the valve case 14 in which the O-type rubber sealing ring 13 is provided, so as to function as concentric positioning, such that the concentricity between the external arcuate surface of the rotor 8 and the internal arcuate surfaces of the stator side sheets 2 can be maintained within 0.03 mm, and precise positioning of the vertical distance between the centerlines of rotor shaft 7 and the valve port 17 can be achieved.

As to the portion of the vertical rotor-type electromagnet that penetrates into the valve case 14, one end of the swing arm 18 is secured to the outer end of the rotor shaft 7 by means of a bolt, the rubber sealing gasket 21 are putted on the circular outer end of the swing arm 18 and the circular boss thereof and matched. The rotor shaft 7 is overlapped with a transverse plane of the valve port 17, and a work plane of the rubber sealing gasket 21 is press against the transverse plane of the valve port 17. The rubber sealing gasket 21 has a seal gasket 20 mounted thereon and is tightly pressed by a gasket spring 19. The center of the circular outer end of the swing arm 18 is drilled a blind hole with a diameter of 4 mm, and a permanent magnet 22 is installed in the blind hole. A magnetic conductor regulating block 23 is mounted in the valve port 17 and attracted by the permanent magnet 22, and it is a low-chrome steel ball with a diameter of 6 mm which follows the movement of the rubber sealing gasket 21. The upper internal chamber of the valve port 17 is a variable-diameter curved surface that is wide at the top and narrow at the bottom thereof.

In this embodiment, the vertical rotor-type gas solenoid valve of is applied to a gas hot-water heater using liquefied petroleum gas and having a heat load of 30 KW, in which the minimum clearance between the magnetic conductor regulating block 23 and the valve port 17 is 0.06 mm. The magnetic conductor regulating block 23 can be freely displaced transversely for more than 0.4 mm, so that it has a function of regulating its position automatically, and thus the installation and machining thereof require less precision.

When the coil winding 3 is energized with electric current, the joint area where the external arcuate surface of the rotor 8 meets the internal arcuate surfaces of the stator side sheets 2 gradually increases starting from the initial meeting-point thereof, in response to the increasing of the electric current; the rubber sealing gasket 21 are gradually moved away from the valve port 17 by driving the swing arm 18 to move via the rotor shaft 7; the clearance between the magnetic conductor regulating block 23 attracted by the permanent magnet 22 and the upper internal wall of the valve port 17 increases, and the gas entering from the gas inlet 15 of the valve case 14 gradually increases from zero and flows to the gas outlet 16 via the gas inlet 15 and the valve 17. Accordingly, both on-off control of gas and regulation of gas flow can be achieved. In order to prevent the gas utensil from extinguishing even if the gas is regulated to a minimum flow rate, provided that a predetermined minimum magnitude of current is supplied to the coil winding 3, the rotor regulating screw 9 can be regulated such that the minimum opening can be reached between the rubber sealing gasket 21 and the valve port 17. That is to say, the clearance between the magnetic conductor regulating block 23 and the upper internal wall of the valve port 17 can reach the minimum value required by the minimum gas flow. By regulating the regulating screw bracket 12 transversely with a special tool, the angle formed by the centerline of the regulating spring 11 and the rotor regulating screw 9 and the projection line of the side edge of the rotor 8 can be changed. That is to say, when the rotor 8 rotates to a certain angle, the acting force exerted by the regulating spring 11 on the rotor 8 may cause the relationship between the current value of the coil winding 3 and the rotational angle of the rotor 8 to be altered, so that the regulation graph of the gas flow can be varied in order to meet the application requirements. Once the regulation is completed, the regulating screw bracket 12 may be fixed with adhesive agent.

The Second Embodiment

Figure 4:
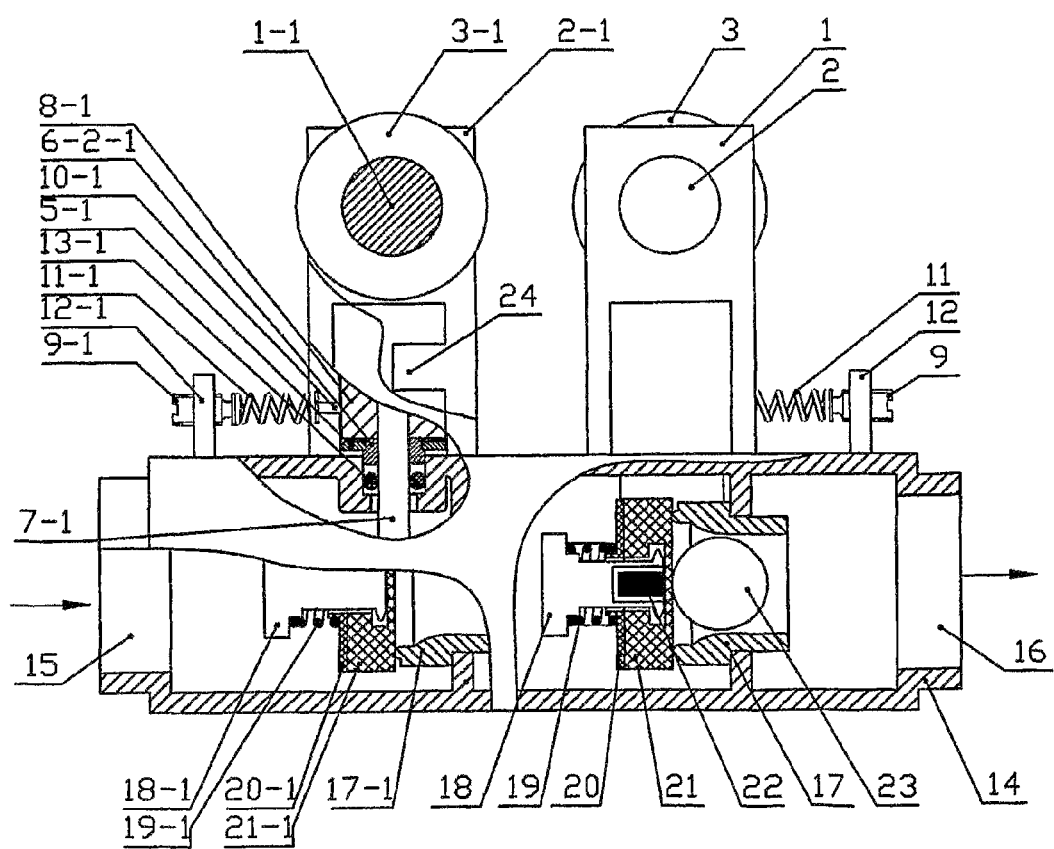
FIG. 4 is a schematic view of structure in which a regulating valve and a strong suction valve are assembled into one piece.

Referring to FIG. 4, this embodiment is a double-closing gas flow regulating valve composed of two vertical rotor-type gas solenoid valves, in which one of the gas solenoid valves serves as a gas regulating valve as same as that described in the first embodiment, and the other gas solenoid valve serves separately as a gas on-off valve. The other gas solenoid valve has a structure similar to the main body structure described in the first embodiment, but differs from it in that the internal arcuate surface of one of stator side sheets 2-1 is provided with a boss 24 and the permanent magnet 22 and the magnetic conductor regulating block 23 are omitted. Specifically, as shown in FIG. 4, the one on the right side is a gas regulating valve, and the one on the left side is a gas on-off valve is, both of them are combined together to form a gas regulating valve having a double-closing effect. In FIG. 4, the stator core 1-1, the stator side sheets 2-1, the upper rotor-retainer sheet 4-1, the lower rotor-retainer sheet 5-1, the bearing boss 6-2-1, the rotor shaft 7-1, the rotor 8-1, the rotor regulating screw 9-1, the regulating nail 10-1, the regulating spring 11-1, the regulating screw bracket 12-1, the rubber sealing ring 13-1, the valve port 17-1, the swing arm 18-1, the gasket spring 19-1, the seal gasket 20-1, the rubber sealing gasket 21-1 of the gas on-off valve are corresponding one by one to the components of the gas regulating valve in a similar position. When the coil winding 3-1 is energized, the rotor 8-1 rotates to the position of boss 24 and engaged with the boss gets by attraction, even when the electric current in the coil winding 3-1 is reduced to ¼ of its rated value, such engagement can be ensured, i.e. the unreleased state of the valve can be remained. Thus, the power consumption of the coil winding 3 can be reduced. The boss 24 is provided merely on one side of the stator side sheet so as to prevent the rotor from being not restored to its original position after the winding current is removed, in the case of the rotor 8-1 or the stator core 1-1 having remanence; i.e., to ensure that the strong suction valve can be released.

Although the forgoing description has described merely with reference to preferred practical embodiments of the present invention, it should be understood that the above-mentioned embodiments can not be used to limit the protection scope of the present invention. Accordingly, all the equivalent structures and variations that can be made by the person skilled in the art based on the principles of the disclosure of the present invention will fall within the scope of the present invention.

What is claimed is:

1. A vertical rotor-type gas solenoid valve comprising: a valve case provided with a gas inlet, a gas outlet and a valve port; a regulating spring; a regulating nail; a rotor regulating screw; a regulating screw bracket; a swing arm; and a vertical rotor-type electromagnet and a rubber sealing gasket assembly arranged at an outer end of the swing arm; the vertical rotor-type electromagnet including a coil winding, a stator core, two stator side sheets, a rotor, an upper rotor-retainer sheet and a lower rotor-retainer sheet, the rotor being in a shape of elongated strip provided with external arcuate surfaces symmetrically at its front and back ends; wherein a rotor shaft of the vertical rotor-type electromagnet is located at a centerline of the stator core, the upper and lower rotor-retainer sheets each is at an angle of 90° with respect to the rotor shaft, the upper rotor-retainer sheet is located on an upper side of the rotor and proximate to an external surface of the coil winding, the lower rotor-retainer sheet is located on a lower side of the rotor and at outer ends of the stator side sheets, outer end arcuate surfaces of the upper and lower rotor-retainer sheets are fastened and connected to the associated internal arcuate surfaces of the stator side sheets respectively, the outer ends of the stator side sheets are fastened on the valve case, the rotor shaft penetrates through the valve case with the swing arm being fixedly mounted at an outer end of the rotor shaft, a rubber sealing gasket of the rubber sealing gasket assembly connected at the outer end of the swing arm is attached against the valve port, a sealing ring is arranged between the rotor shaft and the valve case, a circular hole is provided at the center of the lower rotor-retainer sheet, a bearing boss is secured in the circular hole and an associated portion of valve case, the rotor shaft can be movably connected with a center hole of the bearing boss, the regulating screw bracket that can be displaced in a transverse direction and the rotor regulating screw are arranged outside of the valve case with the regulating spring mounted therebetween, and an outer end of the regulating nail is contacted with and connected to an adjacent side surface of the rotor.

2. The vertical rotor-type gas solenoid valve according to claim 1, wherein the stator core of the vertical rotor-type electromagnet has a cross-section in a circular geometrical shape, the stator core is wrapped with an insulating layer having a thickness of 0.05 mm-0.1 mm, and a lacquered wire coil is directly wound on the insulating layer.

3. The vertical rotor-type gas solenoid valve according to claim 1, wherein the upper and lower rotor-retainer sheets are non-magnetic conductors in a shape of elongated strip having a thickness of 0.5 mm-1.5 mm and having the external end surfaces in the form of arcuate surfaces, the outer end arcuate surfaces of the upper and lower rotor-retainer sheets are fixed and connected to the corresponding internal arcuate surfaces of the stator side sheets via bonding adhesive or welding, and a distance between the upper rotor-retainer sheet and the external surface of the coil winding is 0.5 mm-1.5 mm.

4. The vertical rotor-type gas solenoid valve according to claim 1, wherein a clearance between the external arcuate surface of the rotor and the internal arcuate surface of the stator side sheet is 0.1 mm-0.5 mm, and the distances from the upper and lower rotor-retainer sheets to the corresponding upper and lower surfaces of the rotor are 0.5 mm-1 mm.

5. The vertical rotor-type gas solenoid valve according to claim 1, wherein a boss is provided in the internal arcuate surface of one of the two stator side sheets of the stator core, in the case that the vertical rotor-type electromagnet has an iron stopper.

6. The vertical rotor-type gas solenoid valve according to claim 1, wherein an outer end of the swing arm has a circular shape and is provided with a circular boss, the circular boss protrudes into a circular hole of the rubber sealing gasket, in which the circular hole has a shape matching with a shape of the outer end of the swing arm with a clearance retained between the outer end of the swing arm and the circular hole, a gasket spring is arranged between the swing arm and a seal gasket located on the rubber sealing gasket, and a centerline of the rotor shaft is coincidence with a plane of the valve port.

7. The vertical rotor-type gas solenoid valve according to claim 1, wherein the outer end of the swing arm is provided with a center hole in which a blind hole with a diameter of 3 mm-4 mm is provided and a permanent magnet is installed in the blind hole, a magnetic conductor regulating block located at center of a sealing face of the rubber sealing gasket is matched and engaged with the permanent magnet.

8. The vertical rotor-type gas solenoid valve according to claim 1, wherein the magnetic conductor regulating block is in the form of a round sphere or an inverted cone, and a profile line of longitude section of an upper internal wall of the valve port is in the form of a gradually-varied curve in such a way that it is wide at the top and narrow at the bottom.

9. The vertical rotor-type gas solenoid valve according to claim 1, wherein the rotor regulating screw is located on a side of the internal arcuate surface of one of the stator side sheets, the centerline of the regulating spring forms an angle of 90°±30° with respect to a projection line of an end surface of the rotor, and the angle can be regulated by displacing the regulating screw bracket transversely.

* * * * *